US009194488B2

(12) United States Patent
Nakamura et al.

(10) Patent No.: US 9,194,488 B2
(45) Date of Patent: Nov. 24, 2015

(54) VEHICLE CONTROL DEVICE

(71) Applicant: HONDA MOTOR CO., LTD., Tokyo (JP)

(72) Inventors: Kouji Nakamura, Wako (JP); Masayuki Hagiwara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/415,238

(22) PCT Filed: Jul. 8, 2013

(86) PCT No.: PCT/JP2013/068629
§ 371 (c)(1),
(2) Date: Jan. 16, 2015

(87) PCT Pub. No.: WO2014/013901
PCT Pub. Date: Jan. 23, 2014

(65) Prior Publication Data
US 2015/0167839 A1    Jun. 18, 2015

(30) Foreign Application Priority Data

Jul. 17, 2012    (JP) .................................. 2012-158937

(51) Int. Cl.
*F02D 29/06* (2006.01)
*F16H 61/14* (2006.01)
*F02D 41/04* (2006.01)
(Continued)

(52) U.S. Cl.
CPC .............. *F16H 61/143* (2013.01); *F02D 29/00* (2013.01); *F02D 29/06* (2013.01); *F02D 41/042* (2013.01); *F02D 41/12* (2013.01); *F02D 41/126* (2013.01); *F16H 61/14* (2013.01); *H02J 7/1446* (2013.01); *B60K 41/02* (2013.01); *B60W 10/026* (2013.01); *F02D 2200/501* (2013.01);
(Continued)

(58) Field of Classification Search
None
See application file for complete search history.

(56) References Cited

U.S. PATENT DOCUMENTS

2014/0330465 A1 *    11/2014    Matsudaira ..................... 701/22

FOREIGN PATENT DOCUMENTS

| JP | 04-135936 A | 5/1992 |
|---|---|---|
| JP | 2001-330141 A | 11/2001 |

(Continued)

OTHER PUBLICATIONS

International Search Report and Written Opinion dated Oct. 1, 2013 corresponding to International Patent Application No. PCT/JP2013/068629 and partial English translation thereof.

*Primary Examiner* — Justin Holmes
(74) *Attorney, Agent, or Firm* — Squire Patton Boggs (US) LLP

(57) ABSTRACT

In a vehicle control apparatus that cuts off fuel supply during deceleration and engages a lockup clutch, it is determined whether a condition that enables to reduce load of the generator is established, and a desired power generation value of the generator is set to a first voltage value and a disengaging vehicle speed at which the lockup clutch is to be disengaged is set to a first vehicle speed when it is determined that the condition is not established, while the desired power generation value of the generator is set to a second voltage value that is determined based on a detected vehicle speed and the disengaging vehicle speed is set to a second vehicle speed that is lower than the first vehicle speed when it is determined that the condition is established, thereby enhancing fuel consumption performance and giving appropriate performance.

12 Claims, 4 Drawing Sheets

(51) Int. Cl.
  *F02D 41/12*   (2006.01)
  *F02D 29/00*   (2006.01)
  *H02J 7/14*    (2006.01)
  *B60W 10/02*   (2006.01)
  *H02P 9/04*    (2006.01)
  *F16H 59/44*   (2006.01)

(52) U.S. Cl.
  CPC ............ *F02D 2250/24* (2013.01); *F16H 59/44* (2013.01); *H02P 9/04* (2013.01)

(56) References Cited

FOREIGN PATENT DOCUMENTS

| | | |
|---|---|---|
| JP | 2002-234340 A | 8/2002 |
| JP | 2004-120877 A | 4/2004 |
| JP | 2004-225879 A | 8/2004 |
| JP | 2004-257442 A | 9/2004 |
| JP | 2004-263646 A | 9/2004 |
| JP | 2009-142068 A | 6/2009 |
| JP | 2010-178531 A | 8/2010 |
| JP | 2012-062967 A | 3/2012 |
| JP | 2012-177399 A | 9/2012 |

* cited by examiner

VEHICLE CONTROL DEVICE

TECHNICAL FIELD

This invention relates to a vehicle control apparatus, more specifically to a vehicle control apparatus for resuming fuel supply after the fuel supply cutoff during vehicle deceleration.

BACKGROUND ART

In the following Patent Reference 1, there has been proposed a technique that cuts off or restricts fuel supply to an engine during vehicle deceleration and controls a lockup clutch of a torque converter to engage, while controlling it to disengage before resuming fuel supply.

In the technique disclosed in the Patent Reference 1, with above mentioned configuration, an engine speed can be kept on or around an idle engine speed as long as possible to elongate a fuel supply cutoff time period to improve fuel consumption performance, and lockup clutch is disengaged before resuming fuel supply so as to suppress torque shock at fuel supply resumption.

Furthermore, in the following Patent Reference 2, it is proposed to control power generation of a generator so as to keep a battery voltage to a predetermined value, and to stop or restrict power generation of the generator for a prescribed time period after receiving a fuel supply resuming signal (command).

PRIOR ART REFERENCES

Patent References

Patent Reference 1: Japanese Laid-Open Patent Application No. H02(1990)-200538
Patent Reference 2: Japanese Patent No. 2760037

SUMMARY OF INVENTION

Problems to be Solved by the Invention

Aside from the above, if the fuel supply cutoff time period is elongated, friction at deceleration increases with increasing gear ratio of a transmission and feeling to be involved in deceleration grows. This sometimes makes it impossible to give appropriate deceleration feeling to the driver. To prevent this, it will be effective to reduce load of the generator.

In view of this, the technique described in the Patent Reference 2 is configured to stop or restrict power generation of the generator for a prescribed time period as mentioned above. However, since power generation is only stopped or restricted after receiving a fuel supply resuming signal (command), it can not prevent sufficiently the increase of friction at deceleration at the fuel supply cutoff.

Further, in the fuel supply cutoff control during vehicle deceleration, the lower a fuel supply resuming vehicle speed (i.e., a lockup clutch disengaging vehicle speed) is set, the longer fuel supply cutoff time period becomes, and hence it becomes possible to enhance the fuel consumption performance. For that reason the operation of the generator should preferably be controlled totally together with disengaging of the lockup clutch. However, the technique described in the Patent Reference 2 teaches nothing about that.

Therefore, the object of this invention is to overcome the above mentioned problems by providing a vehicle control apparatus for executing fuel supply cutoff in an internal combustion engine and engaging the lockup clutch during vehicle deceleration, that controls power generating of a generator and disengaging of the lockup clutch taking the load of the generator into account, thereby enabling to enhance fuel consumption performance and give appropriate deceleration feeling during fuel supply cutoff.

Means for Solving the Problems

In order to achieve the above mentioned object, as recited in claim 1 mentioned below, this invention is configured to have an apparatus for controlling a vehicle having an internal combustion engine mounted thereon, a transmission mechanism that changes rotation of the engine in speed, a torque converter that has a lockup clutch and is disposed between the engine and the transmission mechanism, a generator that is driven by the engine and generates power, and a vehicle deceleration-time controller that controls operation of the vehicle to cut off or restrict fuel supply to the engine and to engage the lockup clutch of the torque converter based on at least a vehicle speed indicative of traveling speed of the vehicle, a speed of the engine and an accelerator opening, comprising: a generator load reducing condition determiner that determines whether a condition that enables to reduce load of the generator is established; and a disengaging vehicle speed setter that sets a disengaging vehicle speed at which the lockup clutch is to be disengaged based on the determination by the generator load reducing condition determiner as to whether or not the condition that enables to reduce the load of the generator is established; wherein the disengaging vehicle speed setter sets a desired power generation value of the generator to a first voltage value and sets the disengaging vehicle speed at which the lockup clutch is to be disengaged to a first vehicle speed when it is determined that the condition that enables to reduce the load of the generator is not established, while sets the desired power generation value of the generator to a second voltage value that is determined based on a detected vehicle speed based on characteristics preset relative to deceleration feeling given to a driver of the vehicle and sets the disengaging vehicle speed to a second vehicle speed that is lower than the first vehicle speed when it is determined that the condition that enables to reduce the load of the generator is established.

In the apparatus according to claim 2 mentioned below, this invention is configured such that the disengaging vehicle speed setter sets the disengaging vehicle speed to the second vehicle speed when the detected vehicle speed is equal to or greater than the first vehicle speed, while setting the disengaging vehicle speed to the first vehicle speed if the disengaging vehicle speed is not set to the second vehicle speed when the detected vehicle speed is smaller than the first vehicle speed.

In the apparatus according to claim 3 mentioned below, this invention is configured such that the disengaging vehicle speed setter sets the desired power generation value of the generator to a third voltage value that is greater than the first voltage value when it is determined by the generator load reducing condition determiner that the condition that enables to reduce the load of the generator is established and the detected vehicle speed is equal to or greater than a third vehicle speed that is greater than the first vehicle speed.

In the apparatus according to claim 5 mentioned below, this invention is configured such that the characteristics are preset in such a manner that the desired power generation value of the generator decreases as the detected vehicle speed becomes low.

In the apparatus according to claim 5 mentioned below, this invention is configured such that the generator load reducing condition determiner determines whether the condition that enables to reduce load of the generator is established by discriminating whether remaining quantity of a battery provided at the vehicle is equal to or greater than a predetermined value.

In the apparatus according to claim 6 mentioned below, this invention is configured such that the generator load reducing condition determiner determines whether the condition that enables to reduce load of the generator is established based on consumption of electric loads of the vehicle.

Effects of the Invention

As recited in claim 1 mentioned below, it is configured to determine whether a condition that enables to reduce load of the generator (driven by the engine to generate power) is established, and set a desired power generation value of the generator to a first voltage value and a disengaging vehicle speed at which the lockup clutch is to be disengaged to a first vehicle speed when it is determined that the condition that enables to reduce the load of the generator is not established, while setting the desired power generation value of the generator to a second voltage value that is determined based on characteristics preset relative to deceleration feeling given to the driver of the vehicle according to a detected vehicle speed and the disengaging vehicle speed to a second vehicle speed that is lower than the first vehicle speed when it is determined that the condition that enables to reduce the load of the generator is established. With this, it becomes possible to further increase the fuel supply cutoff time period by setting the disengaging vehicle speed to the relatively lower second vehicle speed when the condition for reducing the load of the generator is determined to be established, thereby enabling to further enhance fuel consumption performance.

And, by setting the desired power generation value to the smaller second voltage to reduce friction of the engine by that amount, when the condition for reducing the load of the generator is determined to be established, it becomes possible to reduce current to be supplied to the field coil of the generator and hence to decrease friction of the engine by an amount corresponding thereto, thereby enabling to prevent increase of friction at deceleration to mitigate the feeling to be involved in deceleration, thereby enabling to give appropriate deceleration feeling to the driver during fuel supply cutoff. Further, it is configured such that the desired power generation value of the generator is set to the second voltage value that is determined according to characteristics (mapped data) preset relative to deceleration feeling given to the driver according to the detected vehicle speed. With this, in addition to the effects and advantages mentioned above, since it is sufficient if the present characteristics are retrieved from the detected vehicle speed, it becomes possible to determine the second voltage value simply.

In the vehicle control apparatus recited in claim 2 mentioned below, it is configured such that it sets the disengaging vehicle speed to the second vehicle speed when the detected vehicle speed is equal to or greater than the first vehicle speed, while setting the disengaging vehicle speed to the first vehicle speed if the disengaging vehicle speed is not set to the second vehicle speed when the detected vehicle speed is smaller than the first vehicle speed. With this, in addition to the effects and advantages mentioned above, the disengaging vehicle speed will not be changed frequently, thereby enabling to prevent occurrence of control hunching such as occurrence of engaging command of the lockup clutch issued immediately after its disengaging command.

In the vehicle control apparatus recited in claim 3 mentioned below, it is configured such that it sets the desired power generation value of the generator to a third voltage value that is greater than the first voltage value when it is determined that the condition that enables to reduce the load of the generator is established and the detected vehicle speed is equal to or greater than a third vehicle speed that is greater than the first vehicle speed. With this, in addition to the effects and advantages mentioned above, it becomes possible to increase current amount in regeneration to the battery to ensure sufficient battery capacity.

In the vehicle control apparatus recited in claim 5 mentioned below, it is configured such that the characteristics are preset in such a manner that the desired power generation value of the generator decreases as the detected vehicle speed becomes low. With this, in addition to the effects and advantages mentioned above, it becomes possible to further increase the fuel supply cutoff time period, thereby enabling to further enhance fuel consumption performance.

In the vehicle control apparatus recited in claim 6 mentioned below, it is configured such that the generator load reducing condition determiner determines whether the condition that enables to reduce load of the generator is established by discriminating whether remaining quantity of a battery provided at the vehicle is equal to or greater than a predetermined value. With this, in addition to the effects and advantages mentioned above, it becomes possible to determine whether the condition that enables to reduce load of the generator is established more accurately.

In the vehicle control apparatus recited in claim 7 mentioned below, it is configured such that the generator load reducing condition determiner determines whether the condition that enables to reduce load of the generator is established based on consumption of electric loads of the vehicle. With this, in addition to the effects and advantages mentioned above, it becomes possible to determine whether the condition that enables to reduce load of the generator is established more accurately.

DESCRIPTION OF EMBODIMENT

An embodiment for carrying out a vehicle control apparatus according to this invention will now be explained with reference to the attached drawings.

Embodiment

Figure 1:
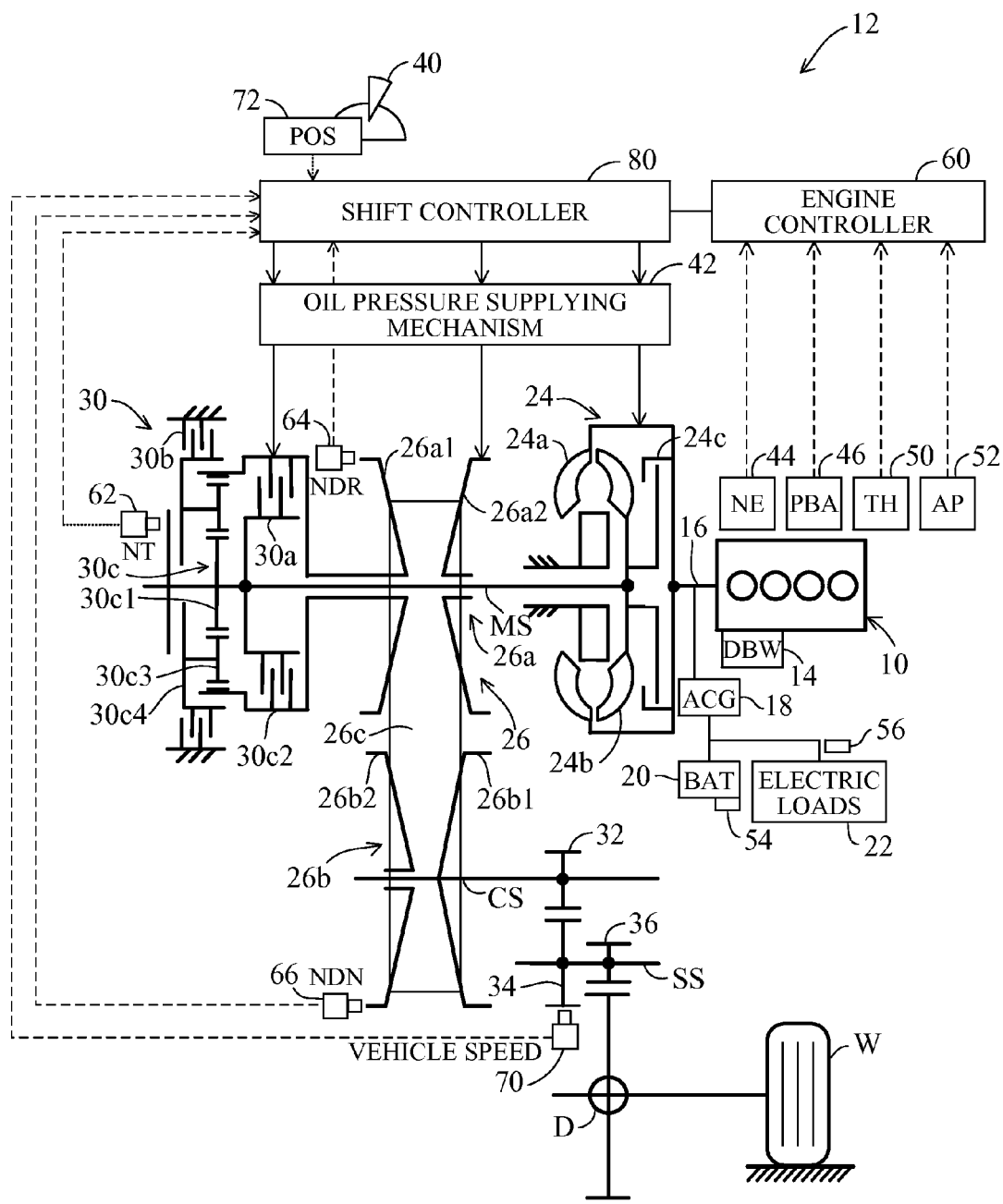
FIG. 1 is an overall schematic diagram showing a vehicle control apparatus according to an embodiment of this invention.

FIG. 1 is an overall schematic diagram showing a vehicle control apparatus according to an embodiment of this invention.

In FIG. 1, symbol 10 indicates an engine (internal combustion engine). The engine 10 is mounted on a vehicle 12 equipped with driven wheels W and the like. The engine 10 comprises a spark-ignited gasoline engine having, for example, four cylinders.

A throttle valve (not shown) provided at the air intake system of the engine 10 is configured to have no mechanical connection with an accelerator pedal (not shown) installed at the vehicle driver seat, and is connected to a DBW (Drive By Wire) mechanism 14 comprising actuators such as electric motors to be driven by it.

Sucked air is regulated by the throttle valve and flows through an intake manifold (not shown) to an intake port of each cylinder where it is mixed with fuel injected by an injector (not shown) to form an air-fuel mixture. The air-fuel mixture flows into a combustion chamber (not shown) of the cylinder when intake valves (not shown) are opened. In the combustion chamber, the air-fuel mixture is ignited by ignition plugs (not shown) and combusts. The resulting combustion drives a piston (not shown) down to rotate an output shaft 16 connected to a crank shaft, thereafter, the exhausted gas is discharged outside of the engine 10.

The rotation of the output shaft 16 of the engine 10 is transmitted to a generator (Alternating Current Generator; hereinafter referred to as "ACG") 18 through a belt/pulley mechanism to drive the ACG 18.

The ACG 18 is equipped with a fixed stator coil and rotatable field coil and outputs (generates) AC power by relative rotation therebetween. The power generated by the ACG 18 is stored in a battery 20 and supplied to auxiliaries such as an air conditioner and electric loads 22 such as lamps.

And, the rotation of the output shaft 16 of the engine 10 is inputted to an automatic transmission (transmission mechanism), more specifically, variable transmission (Continuously Variable Transmission; hereinafter referred to as "CVT") 26 through a torque converter 24. Specifically, the output shaft 16 is connected to a pump impeller 24a through a drive plate of the torque converter 24, while a turbine runner 24b disposed opposing thereto for receiving fluid (operating oil) is connected to a main shaft (transmission input shaft) MS.

The torque converter 24 has a lockup clutch 24c. The lockup clutch 24c is supplied with oil pressure (operating oil) through an oil pressure supplying mechanism mentioned below or is discharged the oil pressure therefrom, and is controlled to engaging (fastening) position and disengaging (releasing) position and any position therebetween. When the lockup clutch 24c is engaged, the torque converter 24 transmits the rotation of the output shaft 16 of the engine 10 to the main shaft MS immediately.

The CVT 26 comprises a drive pulley 26a disposed on the main shaft MS, a driven pulley 26b disposed on a counter shaft (transmission output shaft) CS located parallel to the main shaft MS, and a metal belt 26c wound around the drive/driven pulleys.

The drive pulley 26a is equipped with a fixed pulley half 26a1 installed on the main shaft MS to be irrotatable relative thereto and immovable in the longitudinal direction thereof, and a movable pulley half 26a2 installed on the main shaft MS to be irrotatable relative thereto but movable in the longitudinal direction thereof relative to the fixed pulley half 26a1 and having an oil pressure cylinder chamber (not shown).

The driven pulley 26b is equipped with a fixed pulley half 26b1 installed on the counter shaft CS to be irrotatable relative thereto and immovable in the longitudinal direction thereof, and a movable pulley half 26b2 installed on the counter shaft CS to be irrotatable relative thereto but movable in the longitudinal direction thereof relative to the fixed pulley half 26b1 and having an oil pressure cylinder chamber (not shown).

The CVT 26 is thus provided with the drive pulley 26a that is movable in the longitudinal direction thereof when the oil pressure cylinder chamber of the movable pulley half 26a2 is supplied with operating oil through the oil pressure supplying mechanism mentioned below, the driven pulley 26b that is connected to the driven wheels W and movable in the longitudinal direction thereof when the oil pressure cylinder chamber of the movable pulley half 26b2 is supplied with operating oil, and the belt 26c wound around the drive pulley 26a and the driven pulley 26b.

The belt 26c comprises a plurality of elements having V-shape surface and two rings (bands) for supporting them. The V-shape surface of the element contacts with the side surfaces of the drive pulley 26a and the driven pulley 26b are pressed from the side to change the rotation of the engine 10 in speed and transmit the driving force (torque) of the engine 10 from the drive pulley 26a to the driven pulley 26b.

The CVT 26 transmits the rotation of the engine 10 by a transmission ratio (gear ratio) defined by the arc radius of the driven pulley 26b of the belt 26c and that of the drive pulley 26a (from low to high and vice versa).

The CVT 26 is connected to a forward/reverse switching mechanism 30. The forward/reverse switching mechanism 30 comprises a forward clutch 30a, a reverse brake clutch 30b, and a planetary gear mechanism 30c installed therebetween. The CVT 26 is connected to the engine 10 through the forward clutch 30a.

In the planetary gear mechanism 30c, a sun gear 30c1 is fixed on the main shaft MS, and a ring gear 30c2 is fixed on the fixed pulley half 26a1 of the drive pulley 26a through the forward clutch 30a.

A pinion 30c3 is installed between the sun gear 30c1 and the ring gear 30c2. The pinion 30c3 is coupled to the sun gear 30c1 with a carrier 30c4. The carrier 30c4 is fixed (or locked) upon operation of the reverse brake clutch 30b.

The rotation of the counter shaft CS is transmitted to a secondary shaft (intermediate shaft) SS through deceleration gears 32, 34, and the rotation of the secondary shaft SS is transmitted to the left/right driven wheels (only right wheel shown) W through a gear 36 and a differential D.

Switching between the forward clutch 30a and the reverse brake clutch 30b is conducted by the driver's manipulation of a shift lever 40 that is installed at the vehicle driver seat and has positions P, R, N, D, S, L, etc. When any position of the shift lever 40 is selected by the driver, the selection is transmitted to the manual valve of the above mentioned oil pressure supplying mechanism (shown by symbol 42).

For instance, when any of the D, S, L position is selected, a spool of the manual valve moves and in response thereto, operating oil (oil pressure) is discharged from a piston chamber of the reverse brake clutch 30b, while oil pressure is supplied to a piston chamber of the forward clutch 30a to engage the forward clutch 30a.

When the forward clutch 30a is engaged, all gears rotate integrally with the main shaft MS, and the drive pulley 26a is driven in the same direction as that of the main shaft MS (forward direction).

On the other hand, when the R position is selected, operating oil is discharged from the piston chamber of the forward clutch 30a, while oil pressure is supplied to the piston chamber of the reverse brake clutch 30b to operate the reverse brake clutch 30b. With this, the carrier 30c4 is fixed and the ring gear 30c2 is accordingly driven in a direction opposite to that of the sun gear 30c1, so that the drive pulley 26a is driven in a direction opposite to that of the main shaft MS (reverse direction).

Alternatively, when the P or N position is selected, operating oil is discharged from the both piston chambers, and both of the forward clutch 30a and the reverse brake clutch 30b are discharged, so that the power transmission through the forward/reverse switching mechanism 30 is discontinued, and the power transmission between the engine 10 and the drive pulley 26a of the CVT 26 is blocked.

A crank angle sensor 44 is installed at an appropriate position such as near a crank shaft (not shown) of the engine 10 to output signals at every predetermined crank angle position of the piston indicative of the engine speed NE. In the air intake system, a manifold absolute pressure sensor 46 is installed at an appropriate position downstream of the throttle valve to output signals proportional to manifold absolute pressure (engine load) PBA.

A throttle opening sensor 50 is installed at an actuator of the DBW mechanism 14 to output signals proportional to throttle valve opening TH through rotation amount of the actuator, and an accelerator opening sensor 52 is installed near the accelerator pedal to output signals proportional to accelerator opening AP corresponding to manipulating amount of the accelerator pedal by the driver.

A current sensor 54 is installed at the battery 20 to produce an output indicative of current inputted to or outputted from the battery 20. A current sensor 56 is also installed at a current path to electric loads (including auxiliaries such as wipers and lamps) 22 to produce an output indicative of current consumed by the electric loads 22.

The aforesaid outputs of the crank angle sensor 44 and the like are sent to an engine controller 60. The engine controller 60 has a microcomputer comprising a CPU, ROM, RAM, input/output I/O, etc., and based on their sensor outputs, determines desired throttle opening to control operation of the DBW mechanism 14 and controls fuel injection and ignition timing.

Moreover, the engine controller 60 detects remaining quantity SOC (State of Charge) of the battery 20 from the output of the current sensor 54, and detects electric power consumed by the electric loads 22 from the output of the current sensor 56.

Furthermore, the engine controller 60 controls initiation of fuel supply cutoff (F/C; Fuel Cut) during deceleration of the vehicle 12 and its termination, and calculates a desired value of power generation of the ACG 18. Although not shown, the ACG 18 has a current supply control circuit that controls current supply to the field coil to produce the calculated desired value of power generation.

An NT sensor (rotational speed sensor) 62 is installed at the main shaft MS to output pulse signals indicative of rotational speed of the turbine runner 24b, specifically, rotational speed of the main shaft MS, more specifically, input shaft rotational speed of the forward clutch 30a.

An NDR sensor (rotational speed sensor) 64 is installed at an appropriate position near the drive pulley 26a of the CVT 26 to output pulse signals corresponding to rotational speed of the drive pulley 26a, in other words, output shaft rotational speed of the forward clutch 30a, and an NDN sensor (rotational speed sensor) 66 is installed at an appropriate position near the driven pulley 26b to output pulse signals indicative of rotational speed of the driven pulley 26b.

A vehicle speed sensor (rotational speed sensor) 70 is installed near the gear 36 of the secondary shaft SS to output pulse signals corresponding to the vehicle speed indicative of rotational speed of the output shaft of the CVT 26 and running speed of the vehicle 12 through rotational speed of the gear 36. A shift lever position sensor 72 is installed near the above mentioned shift lever 40 to output a POS (position) signal corresponding to the position such as P, R, N, D selected by the driver.

These outputs of the NT sensor 62 and the like, including outputs of other sensors not shown, are sent to a shift controller 80. The shift controller 80 also has a microcomputer comprising a CPU, ROM, RAM, input/output I/O and the like, and is configured to be communicable with the engine controller 60.

Based on these detected values, the shift controller 80 energizes/de-energizes electromagnetic solenoids in the oil pressure supplying mechanism 42 to control operation of the torque converter 24, the CVT 26 and the forward/reverse switching mechanism 30.

Figure 2:
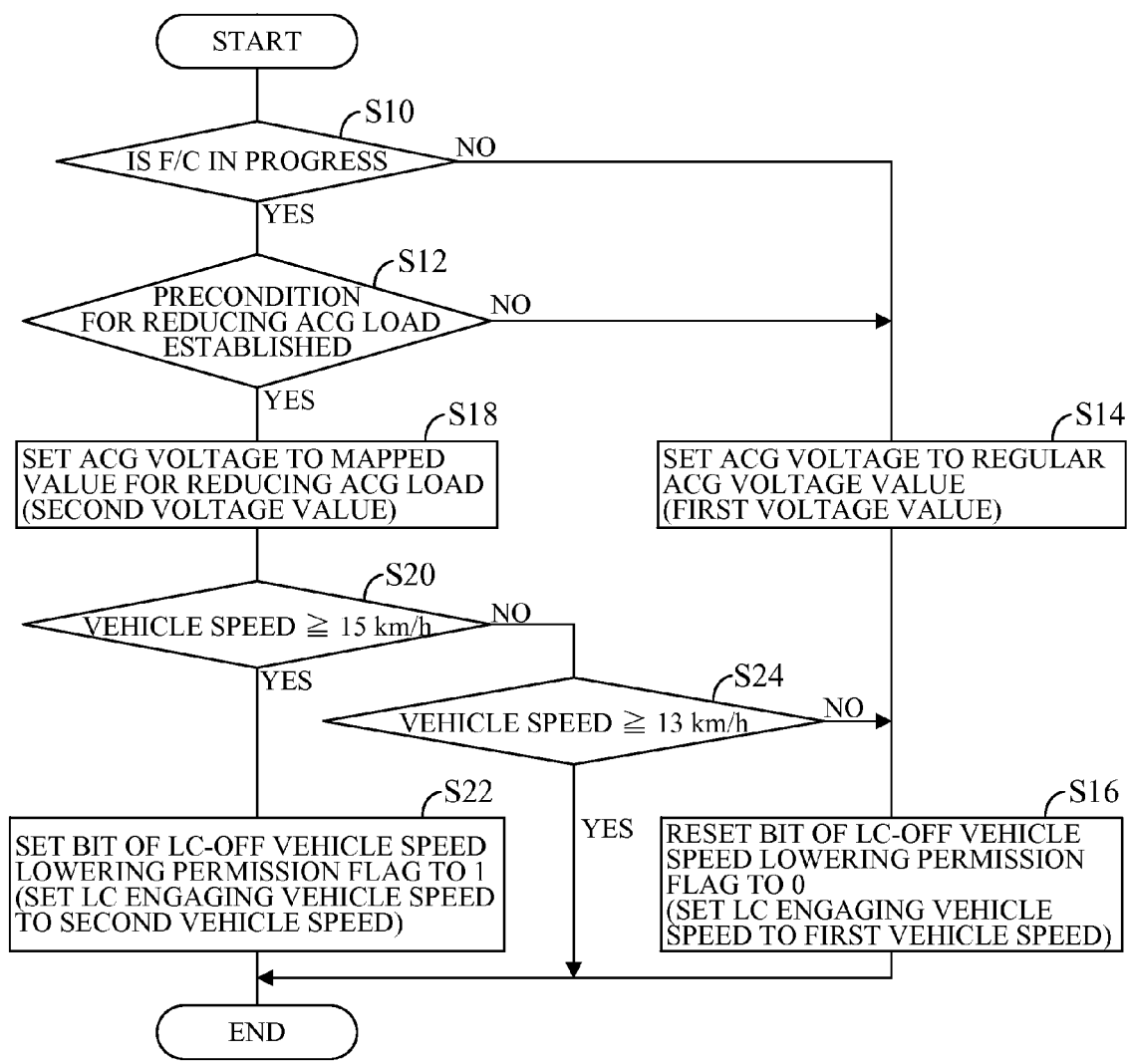
FIG. 2 is a flow chart showing operation of the device shown in FIG. 1.

FIG. 2 is a flow chart showing operation of the engine controller 60 shown in FIG. 1, more specifically, control of fuel supply cutoff during deceleration of the vehicle 12. The shown program is executed at every predetermined time.

Explaining this, the program begins at S10, in which it is determined whether the F/C is in progress, i.e., the fuel supply is cut off. Here, the symbol "S" indicates processing step in FIG. 2.

It should be noted that, in another routine not shown, when it is determined that the engine speed NE and the vehicle speed in absolute value are within predetermined ranges and the accelerator opening is the fully-opened opening (or manifold absolute pressure PBA is equal to or smaller than a predetermined value), fuel supply to the engine 10 is cut off (F/C is executed). In S10, it is determined whether the fuel cutoff is in progress.

When the result in S10 is affirmative, the program proceeds to S12, in which it is determined (or judged) whether a precondition that enables to reduce ACG load is established, i.e., a condition that enables to reduce load of the ACG 18 is satisfied.

This is done by determining whether it is possible to reduce electric power (power generation amount) to be supplied to the electric loads 22 from the ACG 18, by discriminating whether the remaining quantity SOC of the battery 20 is equal to or greater than a predetermined value and the consumption by the electric loads 22 such as lamps or wipers is zero (or very small), for example.

When the result in S12 is negative and it is determined that the condition that enables to reduce load of the ACG 18 is not established, the program proceeds to S14, in which an ACG voltage, i.e., a desired value of power generation of the ACG 18 is set to a regularly desired ACG voltage value (first voltage value; for example, 14.5 V).

The program next proceeds to S16, in which the bit of an LC-OFF vehicle speed lowering permission flag is reset to 0 and a vehicle speed for disengaging the lockup clutch 24c of the torque converter 24 is set to a first vehicle speed (for example, 15 km/h). When the result in S10 is negative, the program also proceeds to S14, S16.

On the other hand, when the result in S12 is affirmative and it is determined that the condition that enables to reduce the load of the ACG 18 is established, the program proceeds to S18, in which the ACG voltage, i.e., the desired value of power generation of the ACG voltage of the ACG 18 is set to a mapped value for reducing ACG load.

Figure 3:
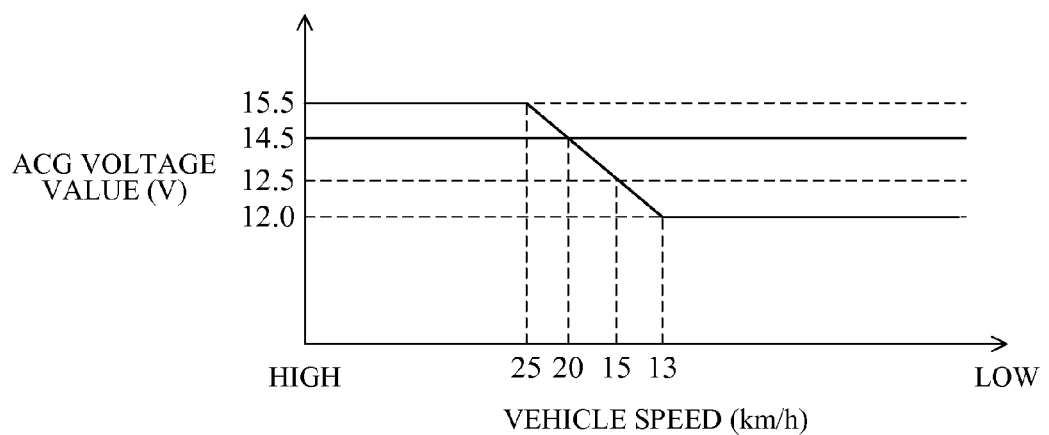
FIG. 3 is an explanatory diagram showing characteristics (mapped value) of a second voltage value used in a desired power generation value setting of FIG. 2 flow chart.

FIG. 3 is an explanatory diagram showing characteristics of the mapped value. As shown, the ACG voltage (desired value of power generation of the ACG 18) is preset relative to the vehicle speed. More specifically, the ACG voltage is set to 15.5 V when the vehicle speed is greater than 25 km/h, where-after it is decreased with decreasing vehicle speed. It is set to 12.5V when the vehicle speed is 15 km/h (first vehicle speed), and is set to 12V when the vehicle speed is 13 km/h (second vehicle speed).

In S18, it is determined by retrieving characteristics of the mapped data shown in FIG. 3 from the detected vehicle speed. The ACG voltage determined in S18 is deemed as a second voltage value.

The program next proceeds to S20, in which it is determined whether the detected vehicle speed is equal to or greater than 15 km/h. When the result in S20 is affirmative, the program proceeds to S22, in which the bit of the above mentioned flag is set to 1 and the vehicle speed for disengaging the lockup clutch 24c is set to the second vehicle speed (for example, 13 km/h) that is smaller than the first vehicle speed.

On the contrary, when the result in S20 is negative, the program proceeds to S24, in which it is determined whether the detected vehicle speed is equal to or greater than 13 km/h. When the result in S24 is affirmative, the program skips subsequent processing, whereas when the result in S24 is negative, the program proceeds to S16.

To be specific, when the vehicle speed is equal to or greater than 15 km/h (first vehicle speed), the disengaging vehicle speed is set to the second vehicle speed (13 km/h), while when the vehicle speed is smaller than 15 km/h, more correctly, smaller than 15 km/h and is not equal to or greater than the smaller vehicle speed (13 km/h), in other words, when the disengaging vehicle speed is not set to the second vehicle speed, the disengaging vehicle speed is set to 15 km/h (first vehicle speed) so as to prevent occurrence of control hunching.

Figure 4:
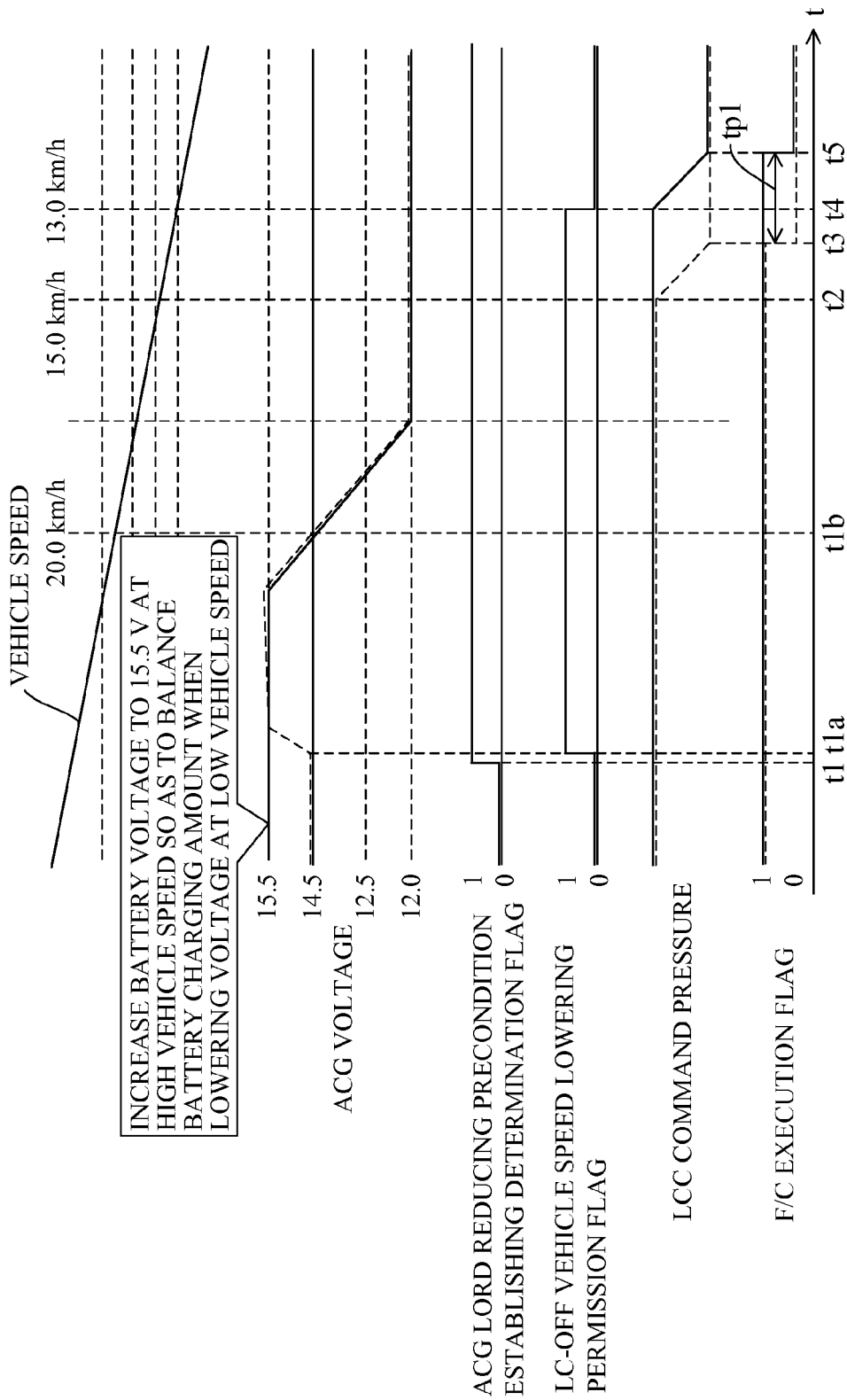
FIG. 4 is a time chart explaining processing of FIG. 2 flow chart.

FIG. 4 is a time chart explaining the processing of FIG. 2.

Explaining with reference to the figure, as mentioned at the beginning, in the control of the F/C, i.e., when the fuel supply cutoff during deceleration of the vehicle 12 is in progress, the lower the fuel supply resuming vehicle speed (in other words, disengaging vehicle speed for disengaging the lockup clutch 24c) is set, the longer the fuel supply cutoff time period is elongated, thereby enabling to enhance fuel consumption performance.

However, when the fuel supply cutoff time period is made longer, friction at deceleration increases as the ratio of the CVT 26 returns to the low side and the feeling to be involved in deceleration grows. This makes sometimes impossible to give appropriate deceleration feeling to the driver and to prevent this, it will be effective to reduce load of the generator.

In view of the above, this embodiment is configured to control generation of the ACG 18 and disengaging of the lockup clutch 24c, taking condition of the electric loads 22 into account. To be more specific, this embodiment is configured to determine whether the condition that enables to reduce the load of the ACG 18 is established and when it is determined that the condition is not established, to set the desired power generation value to the higher first voltage value (e.g., 14.5V) and to set the disengaging vehicle speed to the first vehicle speed (e.g., 15 km/h).

On the contrary, it is configured to set the desired power generation value to the second voltage value (e.g., 12 V) and the disengaging vehicle speed to the lower second vehicle speed (e.g., 13 km/h), when it is determined that the bit of the ACG load reducing precondition establishing determination flat is set to 1 and the condition that enables to reduce the load of the ACG 18 is established as shown at time t1 in FIG. 4.

With this, since the disengaging vehicle speed is set to 15 km/h, for example, when the condition that enables to reduce the load of the ACG 18 is not established, an LCC command value (oil supply command value to the lockup clutch 24c) begins to decrease at time t2 when the vehicle speed becomes lower than the disengaging vehicle speed as shown by dotted lines in the figure and the bit of F/C execution flag is reset to 0 at time t3 (F/C control is terminated).

On the other hand, since the disengaging vehicle speed is set to 13 km/h, for example, when the condition that enables to reduce the load of the ACG 18 is established at time t1, the LCC command value does not decrease by time t4 when the vehicle speed becomes lower than the disengaging vehicle speed and the bit of F/C execution flag will not be reset to 0 by time t5 as shown by a solid line. With this, it becomes possible to elongate the F/C execution time period by a time period (period) tp1.

Further, it is configured to take the load condition of the ACG 18 by determining whether the condition for enabling to reduce the load of the ACG 18 is established. This naturally makes it possible to avoid occurrence of a situation that the use of the electric loads 22 is restricted.

Furthermore, it should be noted that the embodiment is configured to set the desired power generation value to a value (e.g., 15.5 V; third voltage value) that is higher than the first voltage (e.g., 14.5 V) for a predetermined time period from time t1 a to time t5 1b, when it is determined that the condition that enables to reduce the load of the ACG 18 is established and the detected vehicle speed is equal to or greater than the third vehicle speed (e.g., a speed greater than 20 km/h), so as to increase the charging amount of the battery 20 when lower the voltage at a lower vehicle speed, thereby enabling to ensure sufficient battery charging amount.

As stated above, this embodiment is configured to have an apparatus for controlling a vehicle (12) having an internal combustion engine (10) mounted thereon, a transmission mechanism (CVT 26) that changes rotation of the engine in speed, a torque converter (24) that has a lockup clutch (24c) and is disposed between the engine and the transmission mechanism, a generator (ACG 18) that is driven by the engine and generates power, and a vehicle deceleration-time controller (engine controller 60) that controls operation of the vehicle 12 to cut off or restrict fuel supply to the engine and to engage the lockup clutch 24c of the torque converter 24 based on at least a vehicle speed indicative of traveling speed of the vehicle, a speed of the engine NE and an accelerator opening, comprising: a generator load reducing condition determiner (S 12) that determines whether a condition that enables to reduce load of the generator (ACG) 18 is established; and a disengaging vehicle speed setter (S14, S16, S18 to S24) that sets a disengaging vehicle speed at which the lockup clutch 24c is to be disengaged based on the determination by the generator load reducing condition determiner as to whether or not the condition that enables to reduce the load of the generator 18 is established; wherein the disengaging vehicle speed setter sets a desired power generation value of the generator to a first voltage value and sets the disengaging vehicle speed at which the lockup clutch is to be disengaged to a first vehicle speed when it is determined that the condition that enables to reduce the load of the generator is not established, while sets the desired power generation value of the generator 18 to a second voltage value (e.g., 12 V) that is determined based on a detected vehicle speed based on characteristics preset relative to deceleration feeling given to a driver of the vehicle and sets the disengaging vehicle speed to a second vehicle speed (e.g., 13 km/h) that is lower than the first vehicle speed when it is determined that the condition that enables to reduce the load of the generator 18 is established. With this, it becomes possible to further increase the fuel supply cutoff time period by setting the disengaging vehicle speed to the relatively lower second vehicle speed when the condition for reducing load of the generator 18 is determined to be established, thereby enabling to further enhance fuel consumption performance.

And, by setting the desired power generation value to the smaller second voltage (e.g., 12 V) to reduce friction of the engine by that amount, when the condition for reducing load of the generator 18 is determined to be established, it becomes possible to reduce current to be supplied to the field coil of the generator 18 and hence to decrease friction of the engine by an amount corresponding thereto, thereby enabling to prevent increase of friction at deceleration to mitigate the feeling to be involved in deceleration, thereby enabling to give appropriate deceleration feeling to the driver during fuel supply cutoff. Further, it is configured such that the desired power generation value of the generator is set to the second voltage value that is determined according to characteristics (mapped data) preset relative to deceleration feeling given to the driver according to the detected vehicle speed. With this, in addition to the effects and advantages mentioned above, since it is sufficient if the preset characteristics are retrieved from the detected vehicle speed, it becomes possible to determine the second voltage value simply.

And the disengaging vehicle speed setter sets the disengaging vehicle speed to the second vehicle speed when the detected vehicle speed is equal to or greater than the first vehicle speed (S20, S22), while setting the disengaging vehicle speed to the first vehicle speed if the disengaging vehicle speed is not set to the second vehicle speed when the detected vehicle speed is smaller than the first vehicle speed (S24, S 16). With this, in addition to the effects and advantages mentioned above, the disengaging vehicle speed will not be changed frequently, thereby enabling to prevent occurrence of control hunching such as occurrence of engaging command of the lockup clutch 24c issued immediately after its disengaging command.

And the disengaging vehicle speed setter sets the desired power generation value of the generator 18 to a third voltage value (e.g., 15.5 V) that is greater than the first voltage value when it is determined by the generator load reducing condition determiner that the condition that enables to reduce the load of the generator 18 is established and the detected vehicle speed is equal to or greater than a third vehicle speed that is greater than the first vehicle speed (as shown in time t1 of FIG. 4). With this, in addition to the effects and advantages mentioned above, it becomes possible to increase current amount in regeneration to the battery 20 to ensure sufficient battery capacity.

And the characteristics are preset in such a manner that the desired power generation value of the generator 18 decreases as the detected vehicle speed becomes low, as shown in FIG. 3. With this, in addition to the effects and advantages mentioned above, it becomes possible to further increase the fuel supply cutoff time period, thereby enabling to further enhance fuel consumption performance.

And the generator load reducing condition determiner determines whether the condition that enables to reduce load of the generator 18 is established by discriminating whether remaining quantity SOC of a battery 20 provided at the vehicle 12 is equal to or greater than a predetermined value.

And the generator load reducing condition determiner determines whether the condition that enables to reduce load of the generator 18 is established based on consumption of electric loads 22 of the vehicle 12.

It should be noted in the above that, the spark-ignited gasoline engine is exemplified as an example of the engine. However, the engine should not be limited thereto and it may be a compression-ignited diesel engine using light oil.

It should further be noted that, the CVT is exemplified as a transmission mechanism. However, it should not be limited thereto and it can be a stepped transmission. The belt is exemplified as a power transmission element wound around the drive pulley and driven pulley of the CVT. However, the power transmission element should not be limited to the belt and it can be, for example, a chain.

INDUSTRIAL APPLICABILITY

According to this invention, in a vehicle control apparatus that cuts off fuel supply during deceleration and engages a lockup clutch, it is determined whether a condition that enables to reduce load of the generator is established, and a desired power generation value of the generator is set to a first voltage value and a disengaging vehicle speed at which the lockup clutch is to be disengaged is set to a first vehicle speed when it is determined that the condition is not established, while the desired power generation value of the generator is set to a second voltage value that is determined based on a detected vehicle speed and the disengaging vehicle speed is set to a second vehicle speed that is lower than the first vehicle speed when it is determined that the condition is established, thereby enhancing fuel consumption performance and giving appropriate performance, thereby enabling to further enhance fuel consumption performance and give an appropriate deceleration feeling during fuel supply cutoff.

DESCRIPTION OF SYMBOLS

10 engine (internal combustion engine), 12 vehicle, 14 DBW mechanism, 24 torque converter, 26 transmission (transmission mechanism; variable transmission CVT), 26a drive pulley, 26a2 movable pulley half, 26b driven pulley, 26b2 movable pulley half, 30 forward/reverse switching mechanism, 42 oil pressure supplying mechanism, 60 engine controller, 80 shift controller

The invention claimed is:

1. An apparatus for controlling a vehicle having an internal combustion engine mounted thereon, a transmission mechanism that changes rotation of the engine in speed, a torque converter that has a lockup clutch and is disposed between the engine and the transmission mechanism, a generator that is driven by the engine and generates power, and a vehicle deceleration-time controller that controls operation of the vehicle to cut off or restrict fuel supply to the engine and to engage the lockup clutch of the torque converter based on at least a vehicle speed indicative of traveling speed of the vehicle, a speed of the engine and an accelerator opening, comprising:

a generator load reducing condition determiner that determines whether a condition that enables to reduce load of the generator is established; and a disengaging vehicle speed setter that sets a disengaging vehicle speed at which the lockup clutch is to be disengaged based on the determination by the generator load reducing condition determiner as to whether or not the condition that enables to reduce load of the generator is established;

wherein the disengaging vehicle speed setter sets a desired power generation value of the generator to a first voltage value and sets the disengaging vehicle speed at which the lockup clutch is to be disengaged to a first vehicle speed when it is determined that the condition that enables to reduce the load of the generator is not established, while sets the desired power generation value of the generator to a second voltage value that is determined based on a detected vehicle speed based on characteristics preset relative to deceleration of the vehicle and sets the disengaging vehicle speed to a second vehicle speed that is lower than the first vehicle speed when it is determined that the condition that enables to reduce the load of the generator is established.

2. The apparatus according to claim 1, wherein the disengaging vehicle speed setter sets the disengaging vehicle speed to the second vehicle speed when the detected vehicle speed is equal to or greater than the first vehicle speed, while setting the disengaging vehicle speed to the first vehicle speed if the disengaging vehicle speed is not set to the second vehicle speed when the detected vehicle speed is smaller than the first vehicle speed.

3. The apparatus according to claim 1, wherein the disengaging vehicle speed setter sets the desired power generation value of the generator to a third voltage value that is greater than the first voltage value when it is determined by the generator load reducing condition determiner that the condition that enables to reduce the load of the generator is established and the detected vehicle speed is equal to or greater than a third vehicle speed that is greater than the first vehicle speed.

4. The apparatus according to claim 1, wherein the characteristics are preset so that the desired power generation value of the generator decreases as the detected vehicle speed decreases.

5. The apparatus according to claim 1, wherein the generator load reducing condition determiner determines whether the condition that enables to reduce load of the generator is established by discriminating whether a charge of a battery provided at the vehicle is equal to or greater than a predetermined value.

6. The apparatus according to claim 5, wherein the generator load reducing condition determiner determines whether the condition that enables to reduce load of the generator is established based on consumption of electric loads of the vehicle.

7. A method for a vehicle having an internal combustion engine mounted thereon, a transmission mechanism that changes rotation of the engine in speed, a torque converter that has a lockup clutch and is disposed between the engine and the transmission mechanism, a generator that is driven by the engine and generates power, and a vehicle deceleration-time controller that controls operation of the vehicle to cut off or restrict fuel supply to the engine and to engage the lockup clutch of the torque converter based on at least a vehicle speed indicative of traveling speed of the vehicle, a speed of the engine and an accelerator opening, comprising the steps of:
determining whether a condition that enables to reduce load of the generator is established; and
setting a disengaging vehicle speed at which the lockup clutch is to be disengaged based on the determination by the step of generator load reducing condition determining as to whether or not the condition that enables to reduce load of the generator is established;
wherein the step of disengaging vehicle speed setting sets a desired power generation value of the generator to a first voltage value and sets the disengaging vehicle speed at which the lockup clutch is to be disengaged to a first vehicle speed when it is determined that the condition that enables to reduce the load of the generator is not established, while sets the desired power generation value of the generator to a second voltage value that is determined based on a detected vehicle speed based on characteristics preset relative to deceleration of the vehicle and sets the disengaging vehicle speed to a second vehicle speed that is lower than the first vehicle speed when it is determined that the condition that enables to reduce the load of the generator is established.

8. The method according to claim 7, wherein the step of disengaging vehicle speed setting sets the disengaging vehicle speed to the second vehicle speed when the detected vehicle speed is equal to or greater than the first vehicle speed, while setting the disengaging vehicle speed to the first vehicle speed if the disengaging vehicle speed is not set to the second vehicle speed when the detected vehicle speed is smaller than the first vehicle speed.

9. The method according to claim 7, wherein the step of disengaging vehicle speed setting sets the desired power generation value of the generator to a third voltage value that is greater than the first voltage value when it is determined by the step of generator load reducing condition determining that the condition that enables to reduce the load of the generator is established and the detected vehicle speed is equal to or greater than a third vehicle speed that is greater than the first vehicle speed.

10. The method according to claim 7, wherein the characteristics are preset so that the desired power generation value of the generator decreases as the detected vehicle speed decreases.

11. The method according to claim 7, wherein the step of generator load reducing condition determining determines whether the condition that enables to reduce load of the generator is established by discriminating whether a charge of a battery provided at the vehicle is equal to or greater than a predetermined value.

12. The apparatus according to claim 11, wherein the step of generator load reducing condition determining determines whether the condition that enables to reduce load of the generator is established based on consumption of electric loads of the vehicle.

* * * * *